United States Patent [19]
Kessler et al.

[11] Patent Number: 5,610,932
[45] Date of Patent: Mar. 11, 1997

[54] SOLID STATE DYE LASER HOST

[75] Inventors: William J. Kessler, Groton, Mass.; Steven J. Davis, Londonderry, N.H.; Daniel R. Ferguson, Melrose; Evan R. Pugh, Lexington, both of Mass.

[73] Assignee: Physical Sciences, Inc., Andover, Mass.

[21] Appl. No.: 377,656

[22] Filed: Jan. 25, 1995

[51] Int. Cl.⁶ .................................................. H01S 3/14
[52] U.S. Cl. ............................................. 372/39; 372/53
[58] Field of Search .................................. 372/39, 51, 53

[56] References Cited

U.S. PATENT DOCUMENTS

| | | | |
|---|---|---|---|
| 4,766,171 | 8/1988 | DeMartino | 372/21 |
| 5,222,092 | 6/1993 | Hench et al. | 372/53 |
| 5,237,582 | 8/1993 | Moses | 372/53 |
| 5,356,667 | 10/1994 | Hench et al. | 372/39 |

OTHER PUBLICATIONS

Kessler et al.; "Novel Solid State Dye Laser Host" (Jan. 26, 1994) pp. 190–201.

Horace Furumoto; "State of the Art High Energy and High Average Power Flashlamp Excited Dye Lasers" SPIE (1986) pp. 111–128 No Month.

Kubin et al.; "Fluorescence Quantum Yields of Some Rhodamine Dyes" Journal of Luminescence 27 (1982) pp. 455–462 No Month.

F. P. Schafer; "Principles of Dye Laser Operation" (1977) pp. 1–85 No Month.

Kessler et al.; "Novel Solid State Dye Laser Host" (1994) Viewgraphs Jan. 1994.

*Primary Examiner*—Rodney B. Bovernick
*Assistant Examiner*—Robert E. Wise
*Attorney, Agent, or Firm*—Testa, Hurwitz & Thibeault, LLP

[57] ABSTRACT

A solid state dye laser incorporating a polyacrylamide gelatin solid host is doped with a laser dye such as rhodamine 6G and pyrromethene 556. The host is aligned within a lasing cavity and is excited to fluorescence by a pumping laser such as a second harmonic Nd:YAG. A container made from pyrex or inorganic oxide glass can be used to encapsulate and protect the gel solid. The solid state dye host exhibits "self healing" after photobleaching due to dye migration within the encapsulated form.

22 Claims, 8 Drawing Sheets

SOLID STATE DYE LASER HOST

BACKGROUND

Dye lasers are known and used in many applications. Despite recent advances in diode laser technology, and the development of widely tunable solid state devices, e.g., Ti:sapphire and alexandrite lasers, it is likely that dye laser usage will continue. As a tunable source of radiation, dye lasers span from the ultraviolet to the infrared. Dye lasers are inherently simple, efficient, and reliable devices. Numerous pump sources can be used to excite the dye lasing medium; and these pump sources lead to pulse widths from picoseconds to microseconds. Dye lasers can also be designed to produce either broadband or narrow linewidth emission, and are further capable of high peak powers, high average powers, and large energy pulses. The sum of these attractive features ensures an important role in dye laser usage for many years.

Despite the attractive features of dye lasers, the liquid medium of the dye laser host is a serious drawback. The laser dye is typically dissolved in an organic solvent which is untidy to work with and is often hazardous to the health of the user. Liquid dye solutions also require large dye/solvent reservoirs and pumps which increase the size and cost of dye laser systems.

It is, accordingly, an object of the invention to provide a solid state dye laser which reduces the afore-mentioned drawbacks of conventional liquid medium dye laser hosts.

Another object of the invention is to provide a dye laser host utilizing solid state technology and which is less costly to manufacture and maintain as compared to existing dye lasers.

Still another object of the invention is to provide improvements to dye laser technology.

These and other objects of the invention will become apparent in the description which follows.

SUMMARY OF THE INVENTION

As used herein, "solid state host," "gel sample," "solid gel matrix," "dye gel," "dye-doped polyacrylamide samples," "solid dye matrix" and "gel solid" refer to a solid state dye laser host constructed according to the invention.

The invention provides, in one aspect, a solid state dye laser host which includes a substantially solid polyacrylamide gelatin doped with a laser dye. The laser dye can be selected from many known dyes, including rhodamines, pyrromethenes, excalites, coumarins, oxazines, and ammonyx. In one aspect, a container encapsulates and/or supports the gelatin, wherein the container is transmissive to at least one florescence wavelength of the laser dye so that the lasing can occur through the container. In addition, the container is preferably transmissive to the excitation source—e.g., the pumping laser—so that the solid dye host can be pumped through the container.

In another aspect of the invention, an improvement to dye lasers of the type having a laser dye host that exhibits lasing action at at least one florescence wavelength is provided. In accord with the invention, the improvement includes a polyacrylamide gel doped with a laser dye.

In still another aspect, the invention provides a solid state dye laser which includes: (i) an optical lasing cavity having a partially reflective and partially transmissive output mirror, (ii) a substantially solid polyacrylamide gelatin, optically aligned within the cavity, that is doped with a laser dye, and (iii) a source for optically pumping the laser dye within the cavity. In such a configuration, a laser beam can be generated from the cavity and transmitted through the mirror. As above, a container can encapsulate or support the gelatin; and, as such, the container is preferably transmissive to the laser beam and to the pumping source radiation.

The solid state laser of the invention can further include one or more lenses which selectively focus radiation from the pumping source to within the gelatin. For example, such radiation can be focused (or defocused) into a mild line focus. In addition, the pumping source can include a laser which generates a wavelength between approximately 300 nm and 1000 nm. Typical pumping sources include Nd:YAG lasers, diode lasers, excimer lasers, nitrogen lasers, alexandrite lasers, Ar+ lasers, copper-vapor lasers, and flashlamps.

In supporting or encapsulating the gelatin solid host, a supporting or encapsulating structure—when used—can be manufactured from material such as sol-gel inorganic oxide glass, pyrex, plastic, and glass.

In one aspect of the invention, a pool of dye is provided to encourage dye migration within the gelatin host. Preferably, such an aspect includes a voltage source which generates a voltage gradient across the gelatin to promote laser dye migration from the pool of dye to regions within the gelatin which become photobleached.

In still another aspect of the invention, the gelatin solid fluoresces at a plurality of wavelengths. As such, the invention can include means for pumping the gelatin to excite one or more of the plurality of wavelengths sequentially or simultaneously to produce a plurality of output laser beams.

The invention also provides a process for formulating a solid state dye laser host, including the steps of (i) combining acrylamide with a cross-linking agent in the presence of catalysts and initiators, and, before a polymerization reaction which formulates a substantially gelatin structure, (ii) doping the pre-formed gelatin structure with one or more laser dyes having one or more base solvents, such as water, ethylene glycol and methanol. The step of combining the acrylamide with a cross-linking agent can include the further step of combining the acrylamide with N,N'-methylenebisacrylamide (Bis). Further, the catalysts and initiators can include ammonium persulfate and TEMED (N,N,N',N'-tetramethylethylenediamine).

The laser dyes, in accord with the invention, include those known dyes such as rhodamine 6G and pyrromethene 556. Other dyes include: DMT (alternatively called BM-Terphenyl), p-Terphenyl (alternatively called PTP), TMQ, DMQ, BPBD-365 (alternatively called Burly PBD), PBD, PPO, p-Quaterphenyl (alternatively called PQP), QUI, TBS, Excalite 377E, Excalite 392E, Excalite 400E, Excalite 351, Excalite 378, Excalite 384, Excalite 389, Excalite 392A, Excalite 398, Excalite 404, Excalite 411, Excalite 416, Excalite 417, Excalite 428, BBQ (alternatively called BiBuQ), LD 390 (alternatively called Quinolon 390), α-NPO, PBBO, DPS, BBO, POPOP, Bis-MSB, Stibene 420 (alternatively called Stibene 3), LD 423, LD 425, Coumarin 440 (alternatively called Coumarin 120), Coumarin 445, Coumarin 450 (alternatively called Coumarin 2), Coumarin 456 (alternatively called Coumarin 4), Coumarin 460 (alternatively called Coumarin 1, Coumarin 47), Coumarin 461 (alternatively called Coumarin 311), LD 466 (alternatively called Coumarin 466), LD 473, Coumarin 478 (alternatively called Coumarin 106), Coumarin 480 (alternatively called Coumarin 102), Coumarin 481 (alternatively called Coumarin 152A, Coumarin 35), Coumarin 485 (alternatively called Coumarin 152), Coumarin 487, LD 489, Coumarin 490 (alternatively called Coumarin 151), LD 490 (alternatively called Coumarin 6H), Coumarin 498, Coumarin 500, Coumarin 503 (alternatively called Coumarin 307), Coumarin 504 (alternatively called Coumarin 314), Coumarin 510, Coumarin 515 (alternatively called Coumarin 30), Coumarin 519 (alternatively called Coumarin 343), Coumarin 521 (alternatively called Coumarin 334), Coumarin 522, Coumarin 522B, Coumarin 523 (alternatively called Coumarin 337), Coumarin 525, Coumarin 535 (alternatively called Coumarin 7), Coumarin 540 (alternatively called Coumarin 6), Coumarin 540A (alternatively called Coumarin 153), Coumarin 545, Pyrromethene 546, Pyrromethene 556, Pyrromethene 556, Fluorescein 548 (alternatively called Fluorescein 27), Disodium Fluorescein (alternatively called Uranin), Fluorol 555 (alternatively called Fluorol 7GA), Rhodamine 3B Perchlorate, Rhodamine 560 Chloride (alternatively called Rhodamine 110), Rhodamine 560 Perchlorate, Rhodamine 575, Rhodamine 590 Chloride (alternatively called Rhodamine 6G), Rhodamine 590 Tetrafluoroborate, Rhodamine 590 Perchlorate, Rhodamine 610 Chloride (alternatively called Rhodamine B Chloride), Rhodamine 610 Perchlorate (alternatively called Rhodamine B Perchlorate), Kiton Red 620 (alternatively called Sulforhodamine B), Rhodamine 640 Perchlorate (alternatively called Rhodamine 101), Sulforhodamine 640 (alternatively called Sulforhodamine 101), DODC Iodide, DCM, DCM II, DCM Special, LD 688, LDS 698 (alternatively called Pyridine 1), LDS 720, LDS 722 (alternatively called Pyridine 2), LDS 730 (alternatively called Styryl 6), LDS 750 (alternatively called Styryl 7), LDS 751 (alternatively called Styryl 8), LDS 759, LDS 765, LDS 798 (alternatively called Styryl 11), LDS 821 (alternatively called Stryl 9/9M), LDS 867, Phenoxazone 660 (alternatively called Phenoxazone 9), Cresyl Violet 670 Perchlorate (alternatively called Kresylviolett), Nile Blue 690 Perchlorate (alternatively called Nileblau), LD 690 Perchlorate (alternatively called Oxazine 4), LD 700 Perchlorate (alternatively called Rhodamine 700), Oxazine 720 perchlorate (alternatively called Oxazine 170), Oxazine 725 Perchlorate (alternatively called Oxazine 1), Oxazine 750 Perchlorate, HIDC Iodide (alternatively called Hexacyanin 2), LD 800 (alternatively called Rhodamine 800), DOTC Iodide, DOTC Perchlorate, HITC Perchlorate, HITC Iodide (alternatively called Hexacyanin 3), DTTC Iodide, IR-144, IR-125, IR-132, IR-143, LDS 925 (alternatively called Styryl 13), IR-140, DNTPC Perchlorate+, DNOTPC Perchlorate+, DMOTC, IR-26 (alternatively called Dye 26), COT-Cyclooctatetraene, 9-Methylanthracene, Ammonyx LO, Ammonyx LO, Ammonyx LO, PC-Propylene Carbonate, Propylene Glycol, Ethylene Glycol, EPH, PPH, DASPI, PICI, DI, DMETCI, DASBTI, DOCI, HICI, Salurable Absorber 580, DQOCI, Pinacyanol, DCI (alternatively called DCI-2), DDBCI, OQTCI, DQTCI, DTCI, DODCI (alternatively called DODC), Cryptocyanine (alternatively called DCI), DTOCI, HIDCI (alternatively called HIDC), NCI, DDI (alternatively called DDCI), DOTCI (alternatively called DOTC), HOITCP (alternatively called HOITC), HITCI (alternatively called HITC), DTP, DNTTCI, OQTICI, IR-143, IR-140, DaQTeC, Q-Switch 5 (alternatively called IR5), Malachite Green, and BDN.

In still another aspect, the invention provides a self-healing dye laser host which includes a substantially solid polyacrylamide gelatin doped with a laser dye. The host is excitable by external radiation to fluoresce and lase within a cavity; and the dye migrates to regions within the gelatin which become photobleached.

In accord with still another aspect of the invention, a polyacrylamide gel is utilized as a solid state host for a laser dye, such as rhodamine 6G laser dye. The host medium has resistance to photobleaching and has "self-healing" properties after high intensity 532 nm pumping. The following list highlights certain observable characteristics of the solid state polyacrylamide gel laser constructed according to the invention:

The gel laser output provides 130 mJ for 345 mJ of 532 nm pump energy, implying an energy conversion efficiency of nearly 40%.

There is negligible photobleaching (<5% energy loss) after $10^4$ laser pulses (10 Hz, 345 mJ pump energy) using a mild line focus.

There is substantially no photodecomposition of the solid gel matrix after $10^4$ laser pulses (10 Hz, 345 mJ pump energy).

The dye gel becomes only mildly warm to the touch after $10^4$ laser pulses (10 Hz, 345 mJ), indicating that the gel has thermal conductivity similar to that of ethylene glycol (50% by volume).

Bleached "cuts" of dye gel produced by extreme 532nm pumping are not evident after a twenty-four hour period. Thus, a "self-healing" process occurs as the dye gel substantially returns to its original conversion efficiency; and air bubbles are also excluded from the dye gel during this healing process.

A suitable solid state laser dye host according to the invention has several preferred characteristics, particularly relating to the potential widespread use of the solid. For example, the solid state dye host of the invention is preferably inexpensive, compact, lightweight, storable, and safe to handle. Without these qualities, dye laser users will be reluctant to change from using the current solvent-based systems. Other important characteristics relate to the dye/host interactions with each other and with the pump radiation source and to the ability to manufacture the host in the desired form to fulfill the needs of an application. Preferred characteristics of the invention are listed in more detail below:

Ability to homogeneously impregnate the host with laser dye;

High spectral transmission at laser dye absorption and emission wavelengths;

Good photostability of solid host;

Good photostability of the laser dye in solid host (photobleaching);

High thermal conductivity of the solid host;

Low solid host index of refraction temperature dependence;

Laser dye/solid host interactions which decreases triplet state formation;

Long laser dye/solid host matrix shelf life;

Low temperature manufacturing: organic dyes are thermally unstable; and

Good optical quality.

Thus, in accord with the invention, a laser dye-doped gel matrix can be laser pumped to produce a solid state dye laser. For example, a 532 nm second harmonic of a Nd:YAG laser can be mildly focused to pump a R6G-doped solid matrix within an optical resonator. Laser oscillation of the dye solid is observed with a high conversion efficiency.

The invention thus provides several advantages. First, solid state dye laser hosts eliminate the use of flammable solvents by entrapping the dyes in a solid, non-bleachable, non-volatile medium. Solid state dye laser rods (or slabs)

according to the invention also increase the packageability of dye laser systems by decreasing their weight and volume. Also, solid hosts eliminate the costly and time consuming maintenance of dye laser solutions and eliminate the need to dispose of large amounts of hazardous solvents.

BRIEF DESCRIPTION OF THE DRAWINGS

A more complete understanding of the invention may be obtained by reference to the drawings, in which.

DETAILED DESCRIPTION OF THE INVENTION

Figure 1:
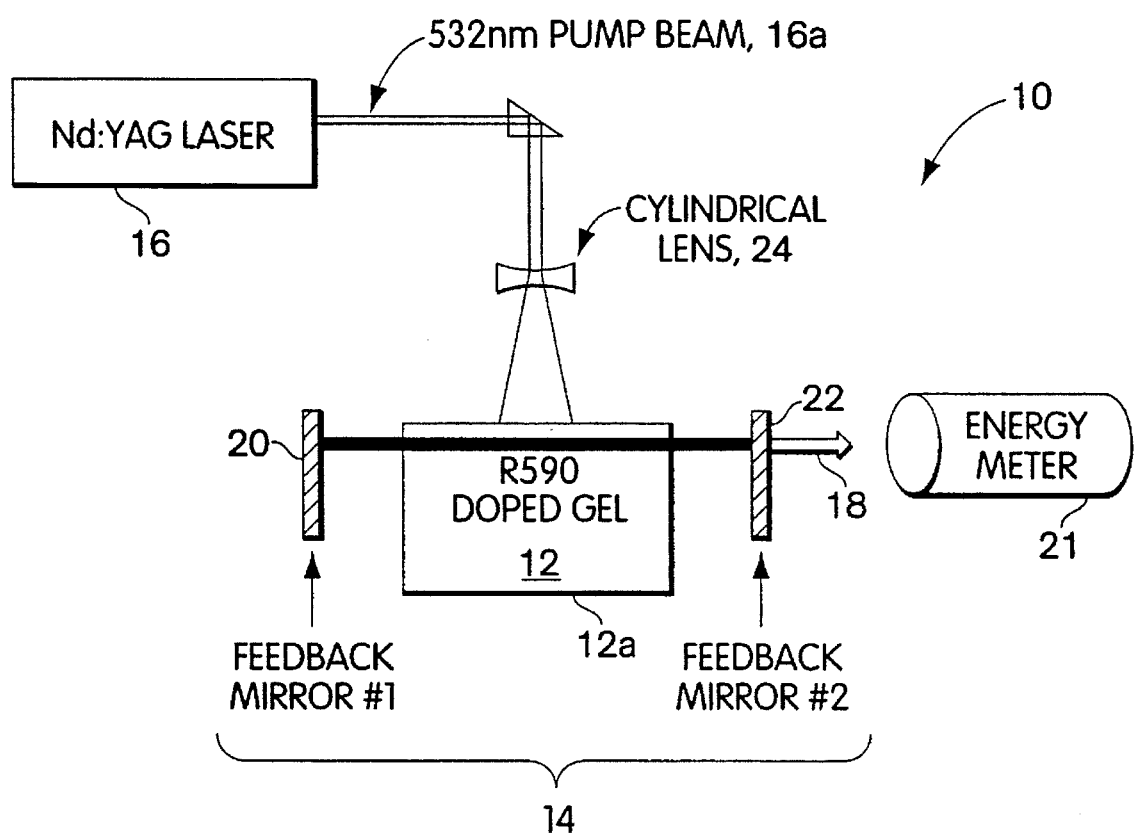
FIG. 1 shows a schematic view of the Nd:YAG laser-pumped solid state polyacrylamide gel dye laser constructed according to the invention.

FIG. 1 shows a dye-doped solid state dye laser 10 constructed according to the invention and which utilizes a polyacrylamide gel as a solid state matrix. A dye-doped solid sample (or "gel") 12 within an optical cavity 14 is pumped by a pumping laser 16, e.g., a Nd:YAG, to achieve laser output 18. In the illustrated embodiment, the dye-doped sample 12 was formulated within a 7.5 cm square pyrex glass container 12a. The illustrated optical cavity 14 is twenty centimeters in length and includes of a full visible wavelength reflector 20 and a 20% reflector 22. A cylindrical lens 24, with a focal length of six inches, focuses the output of the 532 nm frequency doubled Nd:YAG laser 16 into the solid dye matrix 12.

More particularly, the optical cavity 14 contains a dye doped gel 12. The dye gel 12 is transversely pumped by the second harmonic of a Nd:YAG laser 16 at 532 nm. In the illustrated embodiment, the pump laser beam 16a is formed into a mildly focused line using a cylindrical lens 24. Once the laser 10 is aligned, the output 18 provides beam-like character and "laser speckle" away from the optical cavity. Both the beam 18 and the resultant speckle cease when the light emission striking feedback mirror 20 is blocked, indicating stimulated emission and gain.

With such a configuration, an energy meter 21 can show that the solid state polyacrylamide gel dye laser 10 produces efficient laser output 18 oscillation: 130 mJ of output energy is produced from 345 mJ of 532 nm pump energy, implying an energy conversion efficiency of about 38%. The resulting dye laser beam is highly divergent. Using a mild line focus, a negligible photo-bleaching (<5% energy loss) occurs after $10^4$ laser pulses (10 Hz, 345 mJ); and there is no substantial photodecomposition of the solid matrix 12.

The polyacrylamide gel solids of the invention typically display no significant matrix degradation following mild 532 nm irradiation. Even after extended high power pumping, the temperature of the gel samples increases only slightly. However, photobleaching of the rhodamine 6G laser dye within the matrices is observable following high power 532 nm irradiation. The rate of photobleaching is dependent upon the dye concentration within the gel matrix. A process of "self healing" nevertheless occurs within the gel samples wherein the photobleached cuts of dye disappear over a period of hours, which is likely the result of dye molecule migration with the gel matrix.

The polyacrylamide gel of the invention can be formed at room temperature from polymerizing $CH_2CHCCONH_2$, with a cross-linking agent, N,N'-methylenebisacrylamide (Bis). The resulting cross-linked polymer network forms a rubbery solid which is 90–95% base solvent by weight. The polymerization reaction requires the addition of an initiator, ammonium persulfate, $(NH_4)_2S_2O_8$, and proceeds rapidly when the catalyst tetramethylethylenediamine (TEMED), $(CH_3)_2NH_2CCNH_2(CH_3)_2$, is added to the solution. The mechanical and optical properties of the resulting gel are controlled by the polymer concentration and the degree of cross linking. The reaction takes-place via a vinyl polymerization reaction and gives a random, coiled gel structure. For further detail of this reaction, see Gaal, O., Medgyes, G. A. and Vereazhey, L., "Eectrophoresis in the Separation of Biological Macromolecules", Wiley-Interscience Pub., 1980, N.Y., which is herein incorporated by reference. A rhodamine 6G laser dye is incorporated into the acrylamide gel with the base solvents of water, ethylene glycol, and methanol. The procedure can be carried out in less than thirty minutes and results in a solid with a consistency of a gelatin desert such as Jell-O™. It can be contained, for example, in a ⅜ inch capillary cell with optically flat quartz window ends, or in a square glass container. A transmission spectrum of the "neat", undoped gel reveals good visible transparency down to 300 nm in a 1 cm path length.

Variation of the pH may change the structure of the resulting polyacrylamide gel and the reactivity of unpolymerized monomer pools within the gel matrix. The molecular structure may vary from an elongated rod structure to a coiled or hypercoiled type of structure. A change in structure will provide varying environments for the dye molecules to reside in, changing the dye photophysical properties. Coiled structures provide a restricted environment limiting interaction between neighboring dye molecules and potentially harmful radicals and photoproducts. Fluorescence polarization measurements provide insight into the structure of the polymer matrix and the restricted environment of the dye molecules.

Various techniques can be used to polymerize the polyacrylamide gel, including techniques utilizing an initiator and catalyst, an initiator and heat, and an initiator and light (flashlamp curing). Temperature will however effect the polymerization rate, which in turn effects monomer incorporation, opacity, turbidity, and gel homogeneity.

Polymers can also be added to the polyacrylamide matrix to rigidize the resulting polymer. Although the polyacrylamide matrices may benefit by a supporting structure for the rubbery polyacrylamide dye host, the introduction of PMMA, modified PMMA, or an alternative polymer can rigidize the polyacrylamide matrix making the supporting structure unnecessary; in effect, this incorporates the supporting structure into the polyacrylamide matrix. For example, the polyacrylamide gel can be rigidized using an agarose-based derivative, AcrylAide™, as a replacement for the cross-linker in polyacrylamide gels. Gels prepared using this technique are oven dried (60° C.) without cracking, shrinkage or distortion.

By way of background, a polyacrylamide gel is commonly used as an electrophoresis medium in biochemical analysis or separations. Electrophoresis is the movement of charge particles suspended in a liquid, under the influence of an applied electric field. Polyacmylamide gel is a cross-linked polymer network which forms a rubbery solid whose mechanical and optical properties are controlled by the polymer concentration and the degree of cross linking.

In accord with the invention, the absorption spectra of neat, undoped polyacrylamide gels is excitable by numerous optical pump sources, including: Nd:YAG second harmonic lasers, nitrogen lasers, excimer lasers, alexandrite lasers, copper-vapor lasers, diode lasers and flashlamps. Further, dye-doped polyacrylamide samples have absorption spectra that are similar to methanol-based liquid dye solutions. Fluorescence spectra of the dye-doped solids are also similar to methanol-based liquid samples. By way of comparison, fluorescence yields for the rhodamine 6G doped gels approaches 85%, while methanol-based R6G liquids are 95%.

The invention thus provides a solid state laser host for dye lasers with conversion efficiencies similar to presently available commercial dye lasers. The characteristic of "self healing" of the laser medium is significant with positive implications for the use of this solid host in high power devices including slab lasers.

The invention thus has usefulness in many potential applications for solid state dye laser rods, including the following non-limiting list:

Multirod, "gatling gun" type of dye laser capable of lasing over a large frequency range.

A spinning rod arrangement (or alternative shape) for reducing the potential effects of photobleaching.

Application of a voltage gradient across the laser rod to promote laser dye migration within a rod or slab or from a "pool" of dye through the dye rod to replenish photobleached dye.

Encapsulating dye gel rods in sol-gel inorganic oxide glasses sonogel glasses, plastics, PMMA or modified PMMA, or ormosils, to promote shelf life and retain attractive spectral characteristics the use of sol gel as an encapsulating material around the gel host is an attractive supporting structure because of the materials' favorable heat transfer, transmissivity, and fragility characteristics).

Solid state diode laser pumping of gel dye laser rods.

Use of diode laser pumped excitation sources (e.g. diode pumped Nd:YAG laser) for pumping gel dye laser rods.

The following non-limiting experimental results set forth certain optical properties of a solid state laser dye host, constructed according to the invention, which includes a solid polyacrylamide matrix doped with a laser dye such as rhodamine 6G, pyrromethene 556, or other laser dyes.

Experiment 1: Absorption spectra

Figure 2:
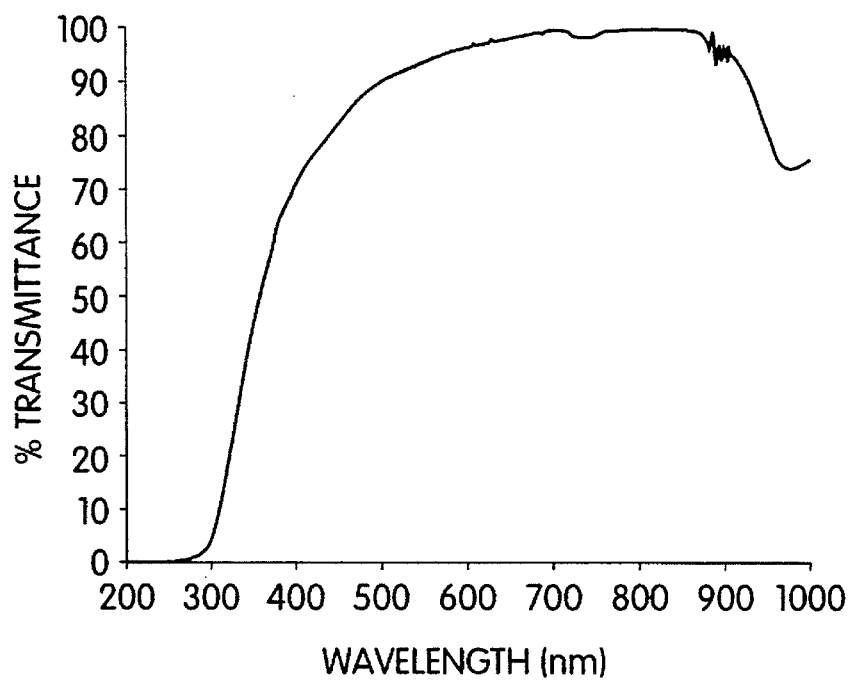
FIG. 2 shows a graph of a neat polyacrylamide gel absorption spectrum.

Undoped and dye-doped gel matrices were prepared in 1×1×5 cm spectrometer cuvettes. FIG. 2 shows the absorption spectrum of neat polyacrylamide gel in a quartz cuvette. This spectrum was recorded in a Shamadzu 3100 UV-VIS-NIR spectrophotometer. The sample pathlength was 1 cm and the instrument slit width was 1 mm. The undoped gel does not display significant absorbance throughout the visible spectrum to 900 nm. In the ultraviolet spectrum there is significant absorbance below 300 nm. The lack of visible absorption shows that 532 nm pumping with a frequency doubled Nd:YAG laser, coppervapor-laser pumping, excimer laser pumping, alexandrite laser pumping and flashlamp pumping are options for an optically pumped dye laser. Absorption in the ultraviolet spectrum may require short absorption depths when pumping with nitrogen (337 nm) or excimer laser (308, 351 nm) or other UV pump sources. Further, pumping sources such as xenon-chloride, nitrogen, YAG, and diode lasers can push the pumping wavelength spectrum to between approximately 300–1000 nm.

Absorption spectra of several dye concentration matrices were recorded. Due to the large absorption cross section of rhodamine 6G laser dye at 530 nm, a thin-film dye-doped gel matrices was prepared. The thin dye-doped matrices were prepared by partially rifling the spectrometer cuvettes with liquid polyacrylamide solution and allowing the gelation to occur while the cuvettes were placed on their sides. The resulting gels were approximately 1–2 mm thick.

Figure 3:
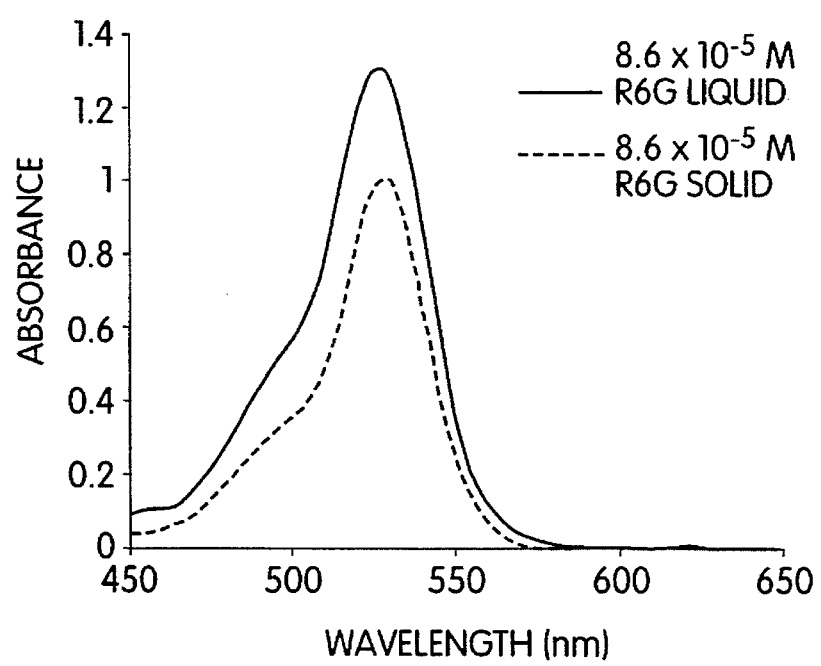
FIG. 3 shows a graph of the absorption spectra of a first 1 mm pathlength rhodamine 6G liquid dye sample and a first 1-2 mm pathlength rhodamine 6G dye-doped polyacrylamide gel solid sample.
Figure 4:
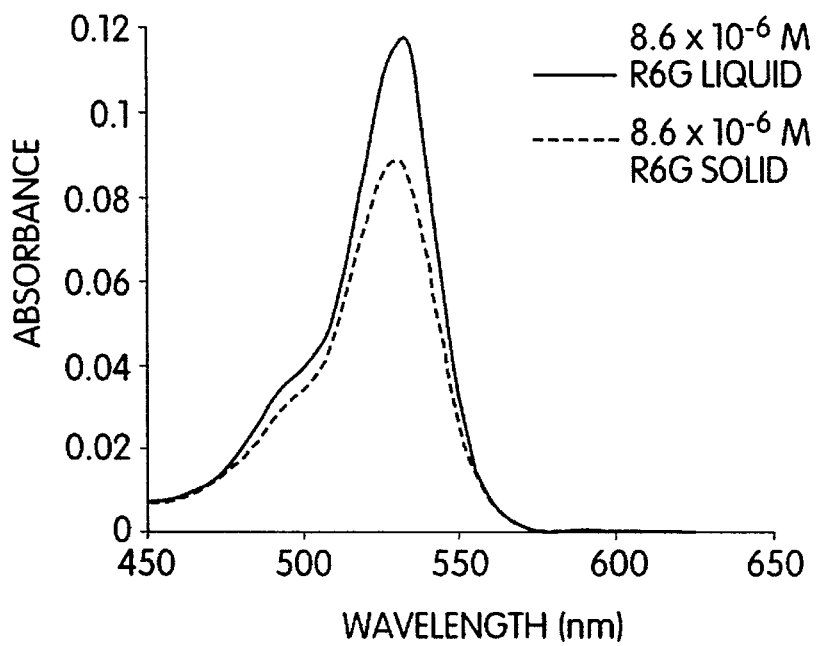
FIG. 4 shows a graph of the absorption spectra of a second 1 mm pathlength rhodamine 6G liquid dye sample and a second 1-2 mm pathlength rhodamine 6G dye-doped polyacrylamide gel solid sample.

The thickness was not uniform throughout each sample or from sample to sample. Absorption spectra of these samples and 1 mm thick methanol-based liquid samples were recorded for comparison of peak location and shape. Absolute peak intensities could not be compared due to the difference in sample thicknesses and the inaccuracies in measuring the thickness of the gel samples. These spectra are shown in FIGS. 3 and 4 for $8.6 \times 10^{-5}$ and $8.6 \times 10^{-6}$ molar concentrations of rhodamine 6G laser dye, respectively. The peak locations and shapes for the solid and liquid samples are nearly identical in the 450–600 nm regions. Higher and lower concentration solid samples also tracked the corresponding liquid samples.

FIGS. 3 and 4 show that the polyacrylamide solid matrix does not significantly effect the absorption spectra of rhodamine 6G laser dye. Without quantitatively comparing the absolute absorption cross section of the solid and liquid samples, qualitative observation suggests that the absolute absorption cross section of the laser dye remains unchanged. This data also suggests that the dye molecules remain dissolved and trapped within the framework of the polyacrylamide gel matrix.

Experiment 2: Fluorescence spectra

Fluorescence spectra of the prepared rhodamine 6G dye-doped solid matrices were recorded for comparison with standard methanol-based rhodamine 6G solutions. These comparisons helped to determine if fluorescence shifts occur due to matrix interactions with the rhodamine 6G dye molecules. Knowledge of these shifts or reductions in fluorescence efficiencies is also helpful in designing the appropriate laser cavity testbed, mirror reflectivities, and dye concentrations for a solid state dye laser device according to the invention.

Figure 5:
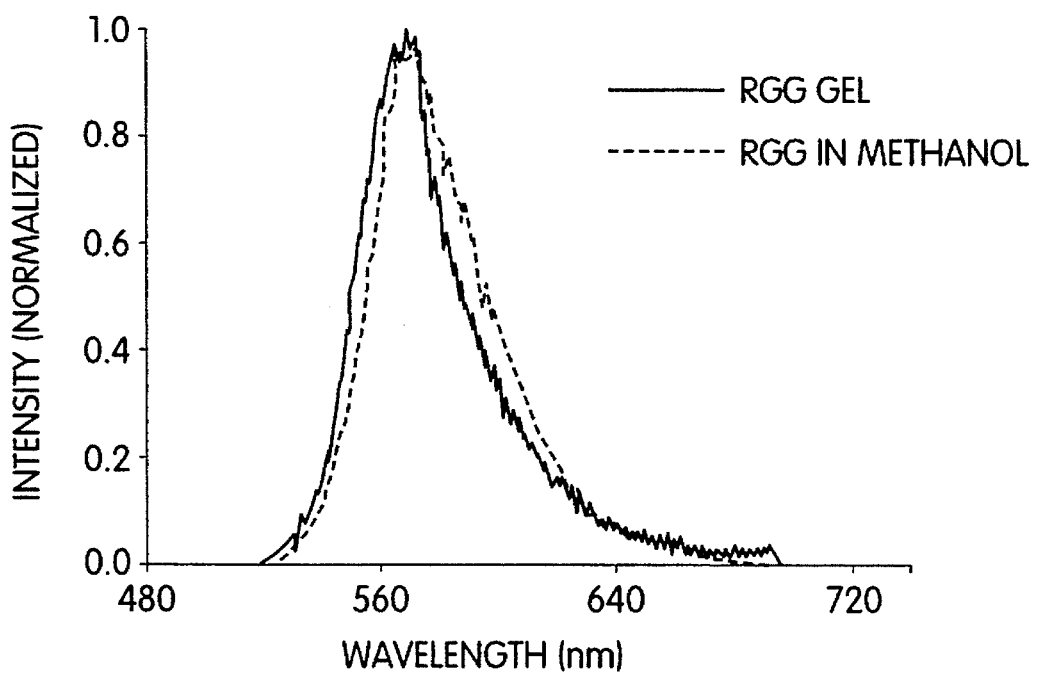
FIG. 5 shows a graph of the fluorescence spectra of rhodamine 6G laser dye as excited by a 514 nm $Ar^+$ laser in a methanol solution and a polyacrylamide gel.

FIG. 5 graphically illustrates the fluorescence spectra of the dye gel and dye solutions using a monochromator/OMA-based system, with the pump excitation provided by a CW $Ar^+$ laser at 514 nm. As shown, the spectral intensities were normalized to unity to allow for easy comparison. The two spectra are almost identical, with the peak of the gel spectrum slightly shifted to the blue of the peak of the dye solution spectrum.

Figure 6:
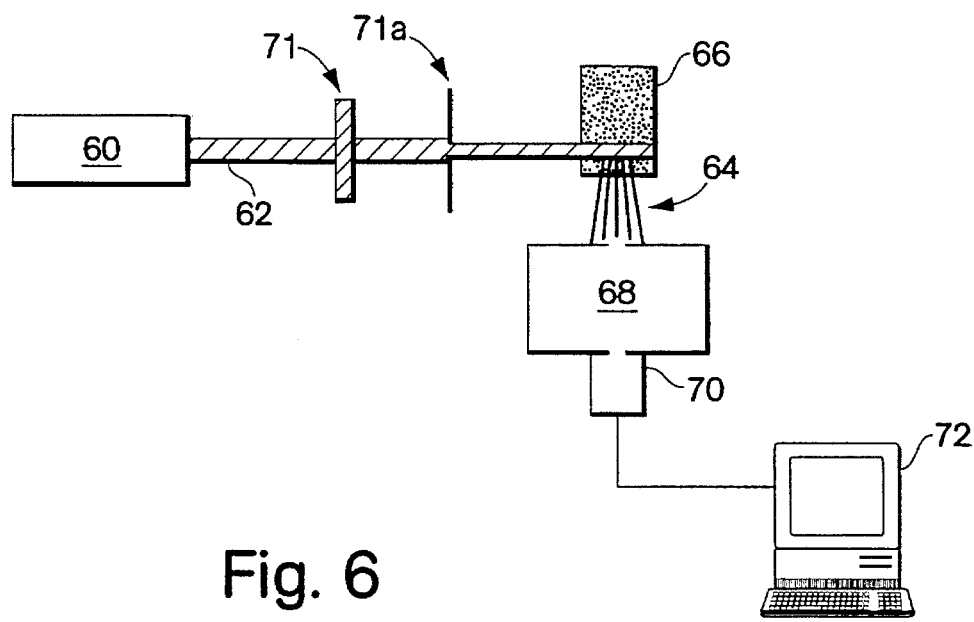
FIG. 6 schematically illustrates a diagram of a fluorescence measurement experimental setup, according to the invention.

A schematic diagram of the pulsed fluorescence measurement setup is shown in FIG. 6. The dye excitation source 60 is a second harmonic (532 nm) of a Quantel International 581C Nd:YAG laser. The typical laser energy beam 62 is 0.5 mJ/pulse. The beam 62 passes through a standard attenuator 71 and IRIS 71a. The side fluorescence 64 from the 1×1 cm dye filled cuvette (liquid or solid) 66 was allowed to overfill the slit of a Instruments SA HR320 monochromator 68 equipped with a Princeton Instruments Optical Multichannel Analyzer, OMA 70. The monochromator 68 was equipped with a 300 line/mm grating blazed at 500 nm. The resulting spectral bandwidth observed was approximately 200 nm, from 500–700 nm. A 400 nm long-pass color glass filter (not shown) was used prior to the slit to avoid any second-order signal. The OMA 70 was operated in a gated mode. Typically, a 100 ns gate was centered upon the 10 ns pump laser pulse. The dye fluorescence 64 was prompt with respect to the pump laser 60 and lasted only during the pump laser pulse. This data was recorded using a laboratory personal computer 72. Typical rhodamine 6G dye fluorescence lifetimes are in the nanosecond regime, as reported by others (see, for example, Schaefer, F. P. ea., "Dye lasers", Topics in Applied Physics, 2nd Edition, SpringerVelag, Berlin (1977), which is herein incorporated by reference).

Fluorescence spectra of pure methanol, the polyacrylamide base solvent, and the undoped polyacrylamide gel were also recorded. Each of these samples did not fluoresce with 532 nm pumping. One can therefore conclude that the fluorescence spectra originates only from the laser dye molecules within the gel matrix.

Figure 7:
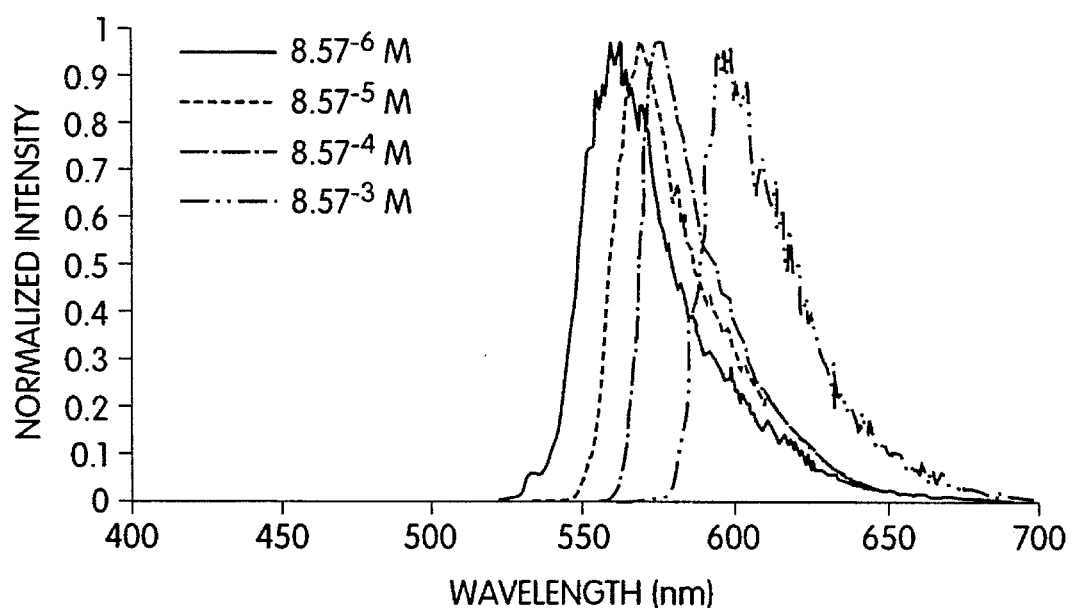
FIG. 7 graphically shows fluorescence spectra of four rhodamine 6G liquid dye concentrations using a 532 nm excitation source.
Figure 8:
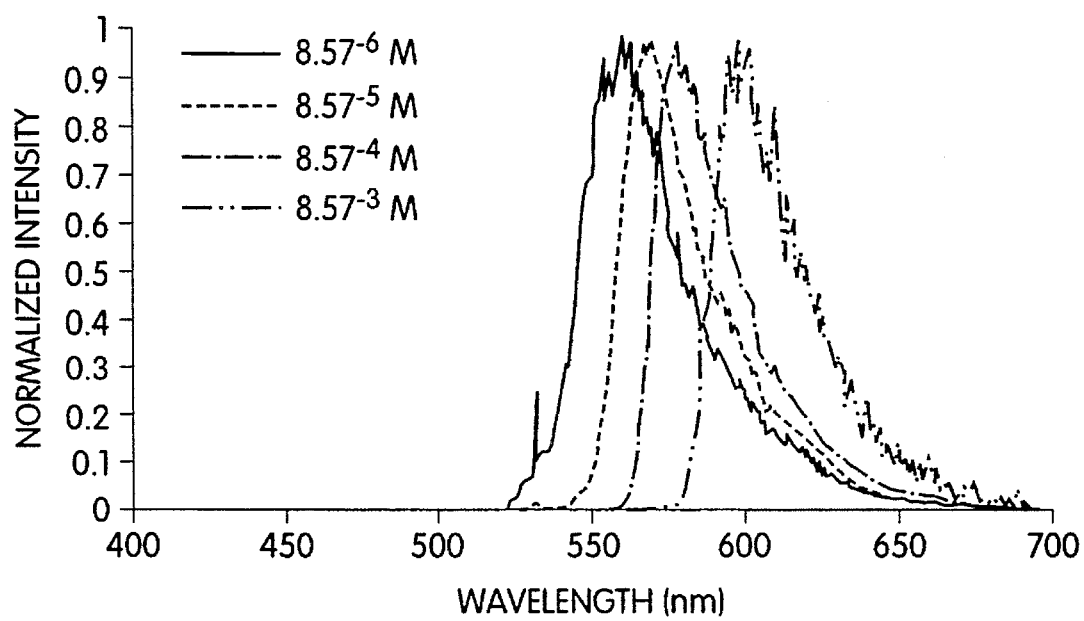
FIG. 8 graphically shows fluorescence spectra of another four rhodamine 6G dye-doped polyacrylamide gel matrices using a 532 nm excitation source.

FIG. 7 shows the fluorescence spectra of four different concentrations of rhodamine 6G dye solutions (i.e., with a methanol solvent). Note that the fluorescence curves are alike in shape but shift to longer wavelengths with increasing concentration. This phenomenon is expected and has been previously reported in the literature (see, e.g., Kubin, R. F. and Fletcher, A. N., "Fluorescence quantum yields of some rhodamine dyes", *J of Luminescence* 27, 455–463 (1982), which is herein incorporated by reference). The peak heights of each of these curves has been normalized for ease of comparison. FIG. 8 shows the fluorescence spectra of four different concentrations of rhodamine 6G dye-doped polyacrylamide matrices. These curves are nearly identical to the liquid dye spectra.

The fluorescence efficiency of the rhodamine 6G-doped polyacrylamide gels was also measured and compared to liquid rhodamine 6G solutions in methanol as a standard reference. The reported fluorescence efficiency of rhodamine 6G dye dissolved in methanol is 95% (see, Furumoto, H., "Flashlamp pumped laser technology", *Proc. of SPIE*, Vol. 609, pp. 111–128 (1986), which is herein incorporated by reference). To measure the solid matrix efficiencies, the integrated fluorescence output from solid and liquid rhodamine 6G samples of the same concentration were compared. In such a comparison, the solid samples typically had fluorescence yields 10 to 30% below that of the corresponding liquid dye samples. This translates to fluorescence efficiencies between 67 and 86%, indicating matrix effects upon the dye molecules.

Figure 9:
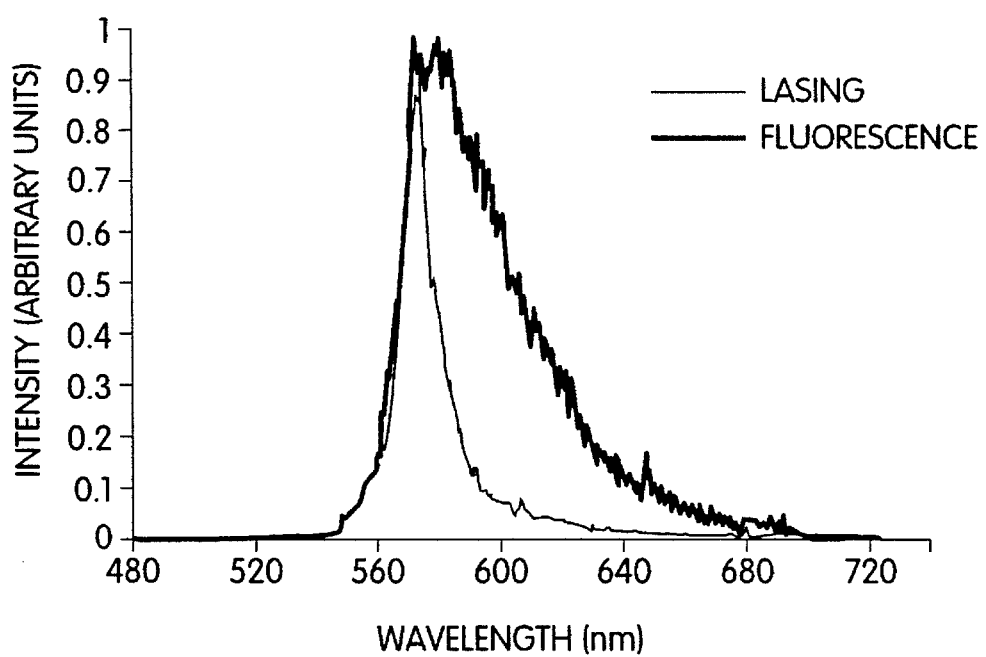
FIG. 9 graphically shows dispersed fluorescence spectra of $8.6\times10^{-4}$M rhodamine 6G dye-doped polyacrylamide gel matrix in a side fluorescence and lasing configuration, according to the invention.

During the fluorescence measurements, a laser cavity was formed by the parallel surfaces of the plastic cuvette containing the solid samples. This demonstrated the high gain and fluorescence efficiency of the dye-doped solids. FIG. 9 displays dispersed spectra of both the normal side fluorescence and lasing output from the solid samples (with the lasing cavity set up by the cuvette walls). The bandwidth of the lasing peak is much narrower than the side fluorescence due to stimulated emission line narrowing. Both curves were normalized for ease of comparison. The intensity of the laser emission appeared to be much greater than that of the side fluorescence.

Figure 10:
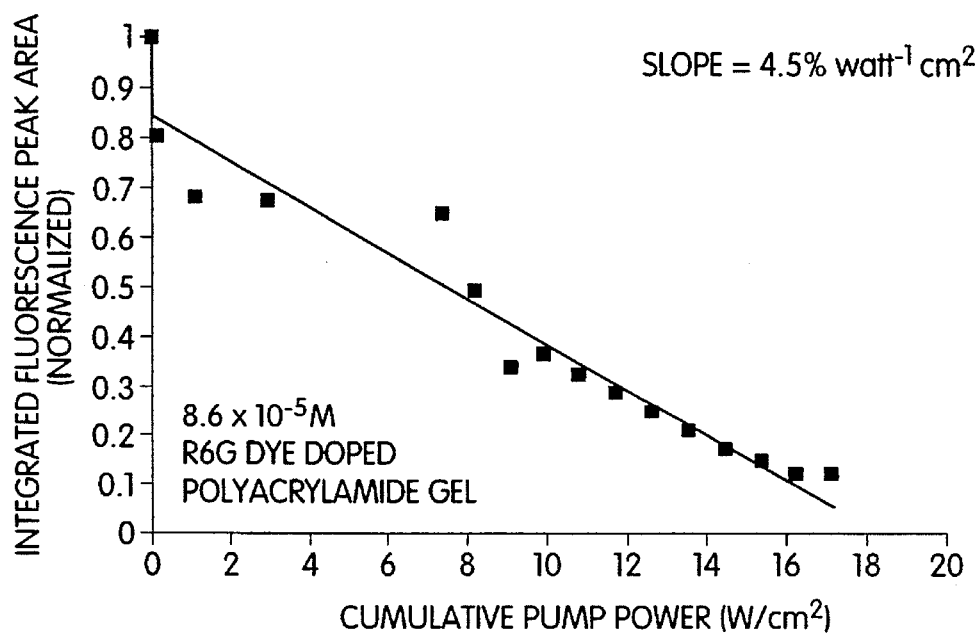
FIG. 10 graphically shows integrated fluorescence as a function of cumulative pump power for an $8.6\times10^{-5}$M rhodamine 6G dye-doped polyacrylamide gel matrix, where the excitation source is a Nd:YAG, 532 nm, 10 Hz, 30 mJ/pulse, 9 mm diameter laser beam.
Figure 11:
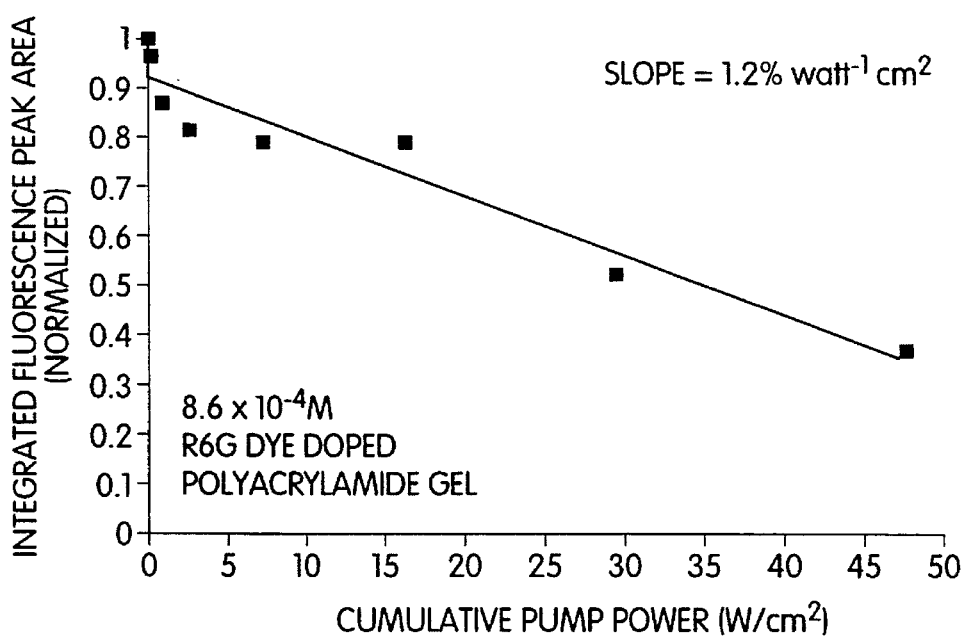
FIG. 11 graphically shows integrated fluorescence as a function of cumulative pump power for an $8.6\times10^{-4}$M rhodamine 6G dye-doped polyacrylamide gel matrix, where the excitation source is a Nd:YAG, 532 nm, 10 Hz, 30 mJ/pulse, 9 mm diameter laser beam.

The 532 nm pumping of the dye-doped solids indicates that the samples were resistant to photobleaching. This was quantified by recording the fluorescence spectra of the solid samples as a function of cumulative pump energy. Trials were conducted for two dye solid concentrations, $8.6 \times 10^{-4}$ and $8.6 \times 10^{-5}$M. Baseline fluorescence spectra for the solid samples were recorded prior to extended 532 nm irradiation. The samples were then pumped with 30 mJ of 532 nm pump energy in a 9 mm diameter beam for a fixed number of shots. A fluorescence spectrum was then recorded (single shot collection) and the process was repeated. FIGS. 10 and 11 display the results, where the area under the fluorescence curve is shown as a function of cumulative laser energy. Both curves reveal that photobleaching does occur, with the rate depending upon the concentration of the dye-doped solid. The higher the dye concentration, the slower the observed photobleaching rate. The rate is slower for higher concentration probably because more dye molecules are available for excitation. As the solid is photobleached, the 532 nm absorption occurs deeper within the solid matrix. At larger cumulative powers, there are less dye molecules available for absorption due to photobleaching and the pump beam propagates through the entire 1 cm sample. Similar tests conducted using liquid dye samples displayed no loss in fluorescence yield as a function of cumulative pump power over the range of powers tested. The difference between the solid and liquid samples may be due to the ability of the spent dye molecules in the liquid sample to be readily replaced by fresh dye molecules for excitation. This process may occur in the solid matrices, but over a much longer time scale.

During the above experiments, a "self healing" within the dye-doped gel is observable. High energy 532 nm pumping of the dye-doped solids caused bleached cuts to occur in the samples. After a period of 12–24 hours, the bleached cuts filled in and eventually disappeared. This "self healing" of the dye solid matrices may be due to diffusion of fresh dye molecules dissolved in the solvent migrating into the region formally populated by spent dye molecules. This conclusion is based, at least in part, on the fact that polyacrylamide gels are used in biochemistry for the separation of proteins by electrophoresis and molecular migration within these gels is a documented phenomenon.

Figure 12:
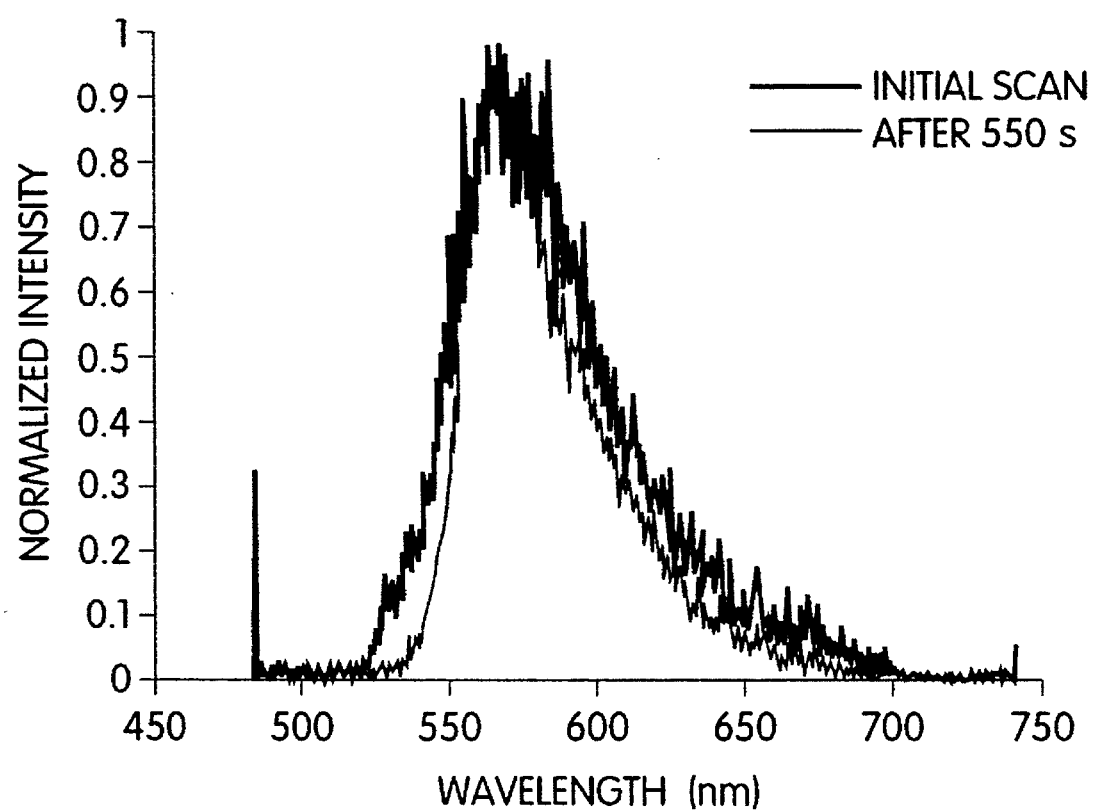
FIG. 12 graphically shows fluorescence spectra displaying the broadening effect of cumulative laser pump power on an $8.6\times10^{-5}$M rhodamine 6G dye-dope polyacrylamide gel matrix.

Fluorescence spectra recorded during the solid dye matrix lifetime testing also revealed a slight broadening of the fluorescence peak with increased cumulative pump power. FIG. 12 shows two fluorescence spectra, the lighter curve is the initial spectra recorded prior to lifetime testing. The darker curve was recorded after 550 s of 10 Hz, 30 mJ/pulse irradiation. Both curves were normalized to unity to facilitate comparison. The partially spent volume of dye molecules irradiated for 550 s emit over a broader wavelength range.

The process of formulating an acrylamide-based gel host for the development of a solid state dye laser, in accord with the invention, can involve a number of different cross-linkers, initiators, and catalysts. The common component in each of these formulations however is the use of the acrylamide base polymer. In addition to the original acrylamide/bisacrylamide based laser dye host, alternative cross-linkers which can provide new properties to the polyacrylamide gel host include: ethylene diacrylate (EDA), N,N'-(1,2-dihydroxyethylene) bisacrylamide (DHEBA), N,N'diallyltartardiamide (DATD), N,N',N''-triallylcitric triamide (TACT), poly (ethylene glycol) diacrylate 200 (PEGDA$_{200}$), N,N1-bisacrylylcystamine (BAC), poly (ethylene glycol) diacrylate 400 (PEGDA$_{400}$) and a series of bis-homologues (di-, tri-, tetra-, penta-, hexa-, hepta-, octa-, nona-, deca- and dodecano-) N,N'-methylene bisacrylamides, each of which is available from Polysciences (Warrington, Pa). This is not an exhaustive list, but a sampling of some of the possible cross-linkers.

Chemical or photochemical processes can also be used in the invention to initiate the polymerization of acrylamide. Three common chemical catalyst systems are (1) ammonium persulphate-N,N,N,N'-tetramethylene-diamine (TEMED); (2) ammonium persulphate-3-dimethylaminopropio-nitrile (DMAPN); and (3) hydrogen peroxide-ferrous sulphate-ascorbic acid. Due to the unstable nature of aqueous ammonium persulphate solutions, potassium persulphate may be substituted. Further, photopolymerization can be carried out in the presence of riboflavin and TEMED; and the polymerization of acrylamide and bisacrylamide may be initiated by light or by ultrasonics.

Thus, the invention provides a process to manufacture dye-doped polyacrylamide gel matrices by chemical polymerization, photopolymerization and thermally induced polymerization. Each of these three techniques utilize a acrylamide/bisacrylamide base. The chemical polymerization utilizes the initiator/catalyst combination of ammonium persulfate and TEMED, as described above. The photopolymerization utilizes ammonium persulfate with the polymerization catalyzed by exposure to broadband optical radiation within a flashlamp-pumped, diffuse reflective coating cavity. The thermally induced polymerization utilizes ammonium persulfate with the polymerization catalyzed by heat when the dye-doped matrices are baked at elevated temperatures (<100 degrees Celcius) for one to twelve hours.

The aforementioned laser dye-doped polyacrylamide gel formulations and polymerization techniques disclose certain techniques which may be utilized in the development of a robust solid state dye laser host material. Those skilled in the art will appreciate that other techniques exist which fall within the scope of the invention.

In addition, there are many laser dyes which can be used with a host constructed according to the invention. For example, while rhodamine 6G was discussed above in connection with several figures and experiments, other laser dyes can be substituted within the polyacrymalide gelatin in accord with the invention, including: pyrromethene 556, DMT (alternatively called BM-Terphenyl), p-Terphenyl (alternatively called PTP), TMQ, DMQ, BPBD-365 (alternatively called Butly PBD), PBD, PPO, p-Quaterphenyl (alternatively called PQP), QUI, TBS, Excalite 377E, Excalite 392E, Excalite 400E, Excalite 351, Excalite 378, Excalite 384, Excalite 389, Excalite 392A, Excalite 398, Excalite 404, Excalite 411, Excalite 416, Excalite 417, Excalite 428, BBQ (alternatively called BiBuQ), LD 390 (alternatively called Quinolon 390), α-NPO, PBBO, DPS, BBO, POPOP, Bis-MSB, Stibene 420 (alternatively called Stibene 3), LD 423, LD 425, Coumarin 440 (alternatively called Coumarin 120), Coumarin 445, Coumarin 450 (alternatively called Coumarin 2), Coumarin 456 (alternatively called Coumarin 4), Coumarin 460 (alternatively called Coumarin 1, Coumarin 47), Coumarin 461 (alternatively called Coumarin 311), LD 466 (alternatively called Coumarin 466), LD 473, Coumarin 478 (alternatively called Coumarin 106), Coumarin 480 (alternatively called Coumarin 102), Coumarin 481 (alternatively called Coumarin 152A, Coumarin 35), Coumarin 485 (alternatively called Coumarin 152), Coumarin 487, LD 489, Coumarin 490 (alternatively called Coumarin 151), LD 490 (alternatively called Coumarin 6H), Coumarin 498, Coumarin 500, Coumarin 503 (alternatively called Coumarin 307), Coumarin 504 (alternatively called Coumarin 314), Coumarin 510, Coumarin 515 (alternatively called Coumarin 30), Coumarin 519 (alternatively called Coumarin 343), Coumarin 521 (alternatively called Coumarin 334), Coumarin 522, Coumarin 522B, Coumarin 523 (alternatively called Coumarin 337), Coumarin 525, Coumarin 535 (alternatively called Coumarin 7), Coumarin 540 (alternatively called Coumarin 6), Coumarin 540A (alternatively called Coumarin 153), Coumarin 545, Pyrromethene 546, Pyrromethene 556, Pyrromethene 556, Fluorescein 548 (alternatively called Fluorescein 27), Disodium Fluorescein (alternatively called Uranin), Fluorol 555 (alternatively called Fluorol 7GA), Rhodamine 3B Perchlorate, Rhodamine 560 Chloride (alternatively called Rhodamine 110), Rhodamine 560 Perchlorate, Rhodamine 575, Rhodamine 590 Chloride (alternatively called Rhodamine 6G), Rhodamine 590 Tetrafluoroborate, Rhodamine 590 Perchlorate, Rhodamine 610 Chloride (alternatively called Rhodamine B Chloride), Rhodamine 610 Perchlorate (alternatively called Rhodamine B Perchlorate), Kiton Red 620 (alternatively called Sulforhodamine B), Rhodamine 640 Perchlorate (alternatively called Rhodamine 101), Sulforhodamine 640 (alternatively called Sulforhodamine 101), DODC Iodide, DCM, DCM II, DCM Special, LD 688, LDS 698 (alternatively called Pyridine 1), LDS 720, LDS 722 (alternatively called Pyridine 2), LDS 730 (alternatively called Styryl 6), LDS 750 (alternatively called Styryl 7), LDS 751 (alternatively called Styryl 8), LDS 759, LDS 765, LDS 798 (alternatively called Styryl 11), LDS 821 (alternatively called Stryl 9/9M), LDS 867, Phenoxazone 660 (alternatively called Phenoxazone 9), Cresyl Violet 670 Perchlorate (alternatively called Kresylviolett), Nile Blue 690 Perchlorate (alternatively called Nileblau), LD 690 Perchlorate (alternatively called Oxazine 4), LD 700 Perchlorate (alternatively called Rhodamine 700), Oxazine 720 perchlorate (alternatively called Oxazine 170), Oxazine 725 Perchlorate (alternatively called Oxazine 1), Oxazine 750 Perchlorate, HIDC Iodide (alternatively called Hexacyanin 2), LD 800 (alternatively called Rhodamine 800), DOTC Iodide, DOTC Perchlorate, HITC Perchlorate, HITC Iodide (alternatively called Hexacyanin 3), DTTC Iodide, IR-144, IR-125, IR-132, IR-143, LDS 925 (alternatively called Styryl 13), IR-140, DNTPC Perchlorate+, DNOTPC Perchlorate+, DMOTC, IR-26 (alternatively called Dye 26), COT-Cyclooctatetraene, 9-Methylanthracene, Ammonyx LO, Ammonyx LO, Ammonyx LO, PC-Propylene Carbonate, Propylene Glycol, Ethylene Glycol, EPH, PPH, DASPI, PICI, DI, DMETCI, DASBTI, DOCI, HICI, Salurable Absorber 580, DQOCI, Pinacyanol, DCI (alternatively called DCI-2), DDBCI, OQTCI, DQTCI, DTCI, DODCI (alternatively called DODC), Cryptocyanine (alternatively called DCI), DTOCI, HIDCI (alternatively called HIDC), NCI, DDI (alternatively called DDCI), DOTCI (alternatively called DOTC), HOITCP (alternatively called HOITC), HITCI (alternatively called HITC), DTP, DNTTCI, OQTICI, IR-143, IR-140, DaQTeC, Q-Switch 5 (alternatively called IR5), Malachite Green, and BDN.

Figure 13:
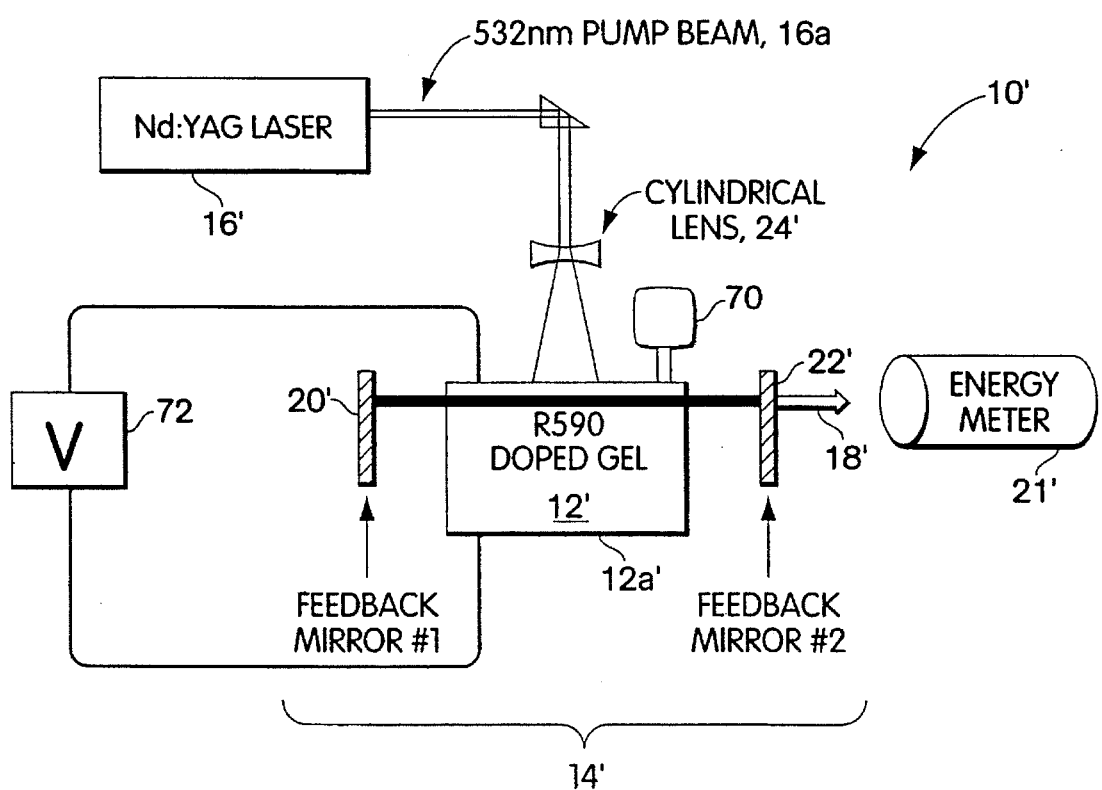
FIG. 13 shows a schematic view of a laser-pumped solid state polyacrylamide gel dye laser constructed according to the invention, and which includes a pool of dye and a voltage source to encourage migration of the due.

FIG. 13 shows a solid state dye laser 10' constructed according to the invention. The components 12', 14', 16', 18', 20', 21', 22' and 24' were substantially described in connection with FIG. 1. FIG. 13 also shows a pool of dye 70 which is in fluid communication with the dye solid 12'. A voltage source 72 is preferably in circuit with the solid 12' to encourage migration of the dye within the pool 70 to those areas within the solid 12' which become photobleached during usage.

In summary, the invention provides several advantages. The solid state laser of the invention is relatively inexpensive and easy to manufacture, as compared to existing dye lasers. It further has the ability to homogeneously impregnate the host with laser dye without substantial effect upon laser dye absorption or emission characteristics. Further, there is solid host photostability and thermal conductivity; while there is small solid host index of refraction temperature dependence. Still other advantages include: long host matrix shelf life; low temperature manufacturing; and good optical quality. The formulation process of the invention provides other advantages, including: nontoxicity after polymerization; the dye doped gel forms a rubbery solid; and the mechanical and optical properties of the gel are substantially controlled by the polymer concentration and the degree of cross-linking.

The invention thus attains the objects set forth above, in addition to those apparent from the preceding description. Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

In view of the foregoing, what is claimed as new and secured by the Letters Patent is:

1. A solid state dye laser host, comprising a substantially solid polyacrylamide gelatin doped with a laser dye.

2. A solid state laser host according to claim 1, wherein the laser dye is selected from the group of rhodamines, pyrromethenes, excalites, coumarins, oxazines, and ammonyx.

3. A solid state laser host according to claim 1, further comprising a container for containing the gelatin, the container being transmissive to at least one florescence wavelength of the laser dye.

4. A solid state laser host according to claim 3, wherein the container is transmissive to at least one wavelength which excites the dye to cause florescence.

5. In a dye laser of the type having a laser dye host that exhibits lasing action at at least one florescence wavelength, the improvement comprising a polyacrylamide gel doped with a laser dye.

6. In a dye laser according to claim 5, the further improvement comprising a container for containing the gel, the container being transmissive to at least one fluorescence wavelength of the dye.

7. A solid state dye laser, comprising:
    (A) an optical lasing cavity having a partially reflective and partially transmissive output mirror,
    (B) a substantially solid polyacrylamide gelatin, optically aligned within the cavity, that is doped with a laser dye,
    (C) a source for optically pumping the laser dye within the cavity, wherein a laser beam is generated from the cavity and transmitted through the mirror.

8. A solid state dye laser according to claim 7, further comprising a container for containing the gelatin, the container being transmissive to the laser beam.

9. A solid state dye laser according to claim 7, further comprising one or more lenses for selectively focusing radiation from the source to within the gelatin.

10. A solid state dye laser according to claim 9 wherein the lenses comprise means for focusing the radiation into a mild line focus.

11. A solid state dye laser according to claim 7, wherein the source comprises a laser generating a wavelength between approximately 300 nm and 1000 nm.

12. A solid state dye laser according to claim 7, wherein the source is selected from the group of Nd:YAG lasers, diode lasers, excimer lasers, nitrogen lasers, alexandrite lasers, Ar+ lasers, copper-vapor lasers, and flashlamps.

13. A solid state dye laser according to claim 7, further comprising a container for containing the gelatin, the container being transmissive to the laser beam.

14. A solid state dye laser according to claim 7, further comprising a supporting structure to support the gelatin, the supporting structure being manufactured from material selected from the group of sol-gel inorganic oxide glass, pyrex, plastic, and glass.

15. A solid state dye laser according to claim 7, further comprising an encapsulating structure for encapsulating the gelatin, the encapsulating structure being manufactured from the group of sol-gel inorganic oxide glass, pyrex, plastic, and glass.

16. A solid state dye laser according to claim 7, further comprising a pool of dye and means for applying a voltage gradient across the gelatin to promote laser dye migration from the pool of dye to regions within the gelatin which become photobleached.

17. A solid state dye laser according to claim 7, wherein the gelatin is doped with a plurality of dyes to provide floroescence at a plurality of wavelengths, and further comprising means for pumping the gelatin to excite said plurality of wavelengths sequentially or simultaneously to produce a plurality of output laser beams.

18. A process for formulating a solid state dye laser host, comprising the steps of combining acrylamide with a cross-linking agent in the presence of catalysts and initiators, and, before a polymerization reaction which formulates a substantially gelatin structure, doping the acrylamide mixture with a laser dye having one or more base solvents.

19. A process according to claim 18, wherein the step of combining the acrylamide with a cross-linking agent comprises the further step of combining the acrylamide with N,N'-methylenebisacrylamide (Bis).

20. A process according to claim 18, wherein the catalysts and initiators comprise ammonium persulfate and TEMED (N,N,N',N'-tetramethylethylenediamine).

21. A process according to claim 18, wherein the step of doping the gelatin includes the step of doping the gelatin with a laser dye selected from the group of rhodamine 6G, pyrromethene 556, DMT (alternatively called BM-Terphenyl), p-Terphenyl (alternatively called PTP), TMQ, DMQ, BPBD-365 (alternatively called Butly PBD), PBD, PPO, p-Quaterphenyl (alternatively called PQP), QUI, TBS, Excalite 377E, Excalite 392E, Excalite 400E, Excalite 351, Excalite 378, Excalite 384, Excalite 389, Excalite 392A, Excalite 398, Excalite 404, Excalite 411, Excalite 416, Excalite 417, Excalite 428, BBQ (alternatively called BiBuQ), LD 390 (alternatively called Quinolon 390), α-NPO, PBBO, DPS, BBO, POPOP, Bis-MSB, Stibene 420 (alternatively called Stibene 3), LD 423, LD 425, Coumarin 440 (alternatively called Coumarin 120), Coumarin 445, Coumarin 450 (alternatively called Coumarin 2), Coumarin 456 (alternatively called Coumarin 4), Coumarin 460 (alternatively called Coumarin 1, Coumarin 47), Coumarin 461 (alternatively called Coumarin 311), LD 466 (alternatively called Coumarin 466), LD 473, Coumarin 478 (alternatively called Coumarin 106), Coumarin 480 (alternatively called Coumarin 102), Coumarin 481 (alternatively called Coumarin 152A, Coumarin 35), Coumarin 485 (alternatively called Coumarin 152), Coumarin 487, LD 489, Coumarin 490 (alternatively called Coumarin 151), LD 490 (alternatively called Coumarin 6H), Coumarin 498, Coumarin 500, Coumarin 503 (alternatively called Coumarin 307), Coumarin 504 (alternatively called Coumarin 314), Coumarin 510, Coumarin 515 (alternatively called Coumarin 30), Coumarin 519 (alternatively called Coumarin 343), Coumarin 521 (alternatively called Coumarin 334), Coumarin 522, Coumarin 522B, Coumarin 523 (alternatively called Coumarin 337), Coumarin 525, Coumarin 535 (alternatively called Coumarin 7), Coumarin 540 (alternatively called Coumarin 6), Coumarin 540A (alternatively called Coumarin 153), Coumarin 545, Pyrromethene 546, Pyrromethene 556, Pyrromethene 567, Fluorescein 548 (alternatively called Fluorescein 27), Disodium Fluorescein (alternatively called Uranin), Fluorol 555 (alternatively called Fluorol 7GA), Rhodamine 3B Perchlorate, Rhodamine 560 Chloride (alternatively called Rhodamine 110), Rhodamine 560 Perchlorate, Rhodamine 575, Rhodamine 590 Chloride (alternatively called Rhodamine 6G), Rhodamine 590 Tetrafluoroborate, Rhodamine 590 Perchlorate, Rhodamine 610 Chloride (alternatively called Rhodamine B Chloride), Rhodamine 610 Perchlorate (alternatively called Rhodamine B Perchlorate), Kiton Red 620 (alternatively called Sulforhodamine B), Rhodamine 640 Perchlorate (alternatively called Rhodamine 101), Sulforhodamine 640 (alternatively called Sulforhodamine 101), DODC Iodide, DCM, DCM II, DCM Special, LD 688, LDS 698 (alternatively called Pyridine 1), LDS 720, LDS 722 (alternatively called Pyridine 2), LDS 730 (alternatively called Styryl 6), LDS 750 (alternatively called Styryl 7), LDS 751 (alternatively called Styryl 8), LDS 759, LDS 765, LDS 798 (alternatively called Styryl 11), LDS 821 (alternatively called Stryl 9/9M), LDS 867, Phenoxazone 660 (alternatively called Phenoxazone 9), Cresyl Violet 670 Perchlorate (alternatively called Kresylviolett), Nile Blue 690 Perchlorate (alternatively called Nileblau), LD 690 Perchlorate (alternatively called Oxazine 4), LD 700 Perchlorate (alternatively called Rhodamine 700), Oxazine 720 perchlorate (alternatively called Oxazine 170), Oxazine 725 Perchlorate (alternatively called Oxazine 1), Oxazine 750 Perchlorate, HIDC Iodide (alternatively called Hexacyanin 2), LD 800 (alternatively called Rhodamine 800), DOTC Iodide, DOTC Perchlorate, HITC Perchlorate, HITC Iodide (alternatively called Hexacyanin 3), DTTC Iodide, IR-144, IR-125, IR-132, IR-143, LDS 925 (alternatively called Styryl 13), IR-140, DNTPC Perchlorate+, DNOTPC Perchlorate+, DMOTC, IR-26 (alternatively called Dye 26), COT-Cyclooctatetraene, 9-Methylanthracene, Ammonyx LO, Ammonyx LO, Ammonyx LO, PC-Propylene Carbonate, Propylene Glycol, Ethylene Glycol, EPH, PPH, DASPI, PICI, DI, DMETCI, DASBTI, DOCI, HICI, Salurable Absorber 580, DQOCI, Pinacyanol, DCI (alternatively called DCI-2), DDBCI, OQTCI, DQTCI, DTCI, DODCI (alternatively called DODC), Cryptocyanine (alternatively called DCI), DTOCI, HIDCI (alternatively called HIDC), NCI, DDI (alternatively called DDCI), DOTCI (alternatively called DOTC), HOITCP (alternatively called HOITC), HITCI (alternatively called HITC), DTP, DNTTCI, OQTICI, IR-143, IR-140, DaQTeC, Q-Switch 5 (alternatively called IR5), Malachite Green, and BDN.

22. A self-healing dye laser host, comprising a substantially solid polyacrylamide gelatin doped with a laser dye, the host being excitable by external radiation to fluoresce and lase within a cavity, the dye migrating to regions within the gelatin which become photobleached.

\* \* \* \* \*